(12) United States Patent
Chen

(10) Patent No.: US 12,481,204 B2
(45) Date of Patent: Nov. 25, 2025

(54) LENS DEVICE

(71) Applicant: CHICONY ELECTRONICS CO., LTD., New Taipei (TW)

(72) Inventor: Hsin-Hung Chen, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 157 days.

(21) Appl. No.: 18/441,684

(22) Filed: Feb. 14, 2024

(65) Prior Publication Data

US 2024/0319474 A1    Sep. 26, 2024

(30) Foreign Application Priority Data

Mar. 22, 2023   (TW) .................................. 112110719

(51) Int. Cl.
| | | |
|---|---|---|
| *G03B 11/04* | (2021.01) | |
| *G02B 7/02* | (2021.01) | |
| *G03B 9/30* | (2021.01) | |
| *G03B 17/12* | (2021.01) | |

(52) U.S. Cl.
CPC ............ *G03B 11/043* (2013.01); *G02B 7/023* (2013.01); *G03B 9/30* (2013.01); *G03B 17/12* (2013.01); *G03B 2217/002* (2013.01)

(58) Field of Classification Search
CPC ...... G03B 9/30; G03B 9/36; G03B 2217/002; G03B 11/043

USPC .......................................................... 359/448
See application file for complete search history.

(56) References Cited

U.S. PATENT DOCUMENTS

2007/0253705 A1* 11/2007 Ho ......................... G03B 17/02
                                                                   396/448
2025/0116915 A1*  4/2025 Lima Neto .......... G03B 11/043

FOREIGN PATENT DOCUMENTS

CN         216817056 U  *  6/2022  ........... G02B 27/646
DE       102020110977 B3 *  6/2021  ............... G03B 9/36

* cited by examiner

*Primary Examiner* — Christopher E Mahoney
(74) *Attorney, Agent, or Firm* — Muncy, Geissler, Olds & Lowe, P.C.

(57) ABSTRACT

A lens device includes a main body, a positioning magnet group, a shutter and a fixed magnet group. The main body includes first and second ends opposite to each other, and first and second sides opposite to each other. The positioning magnet group includes first, second and third positioning magnets. The first positioning magnet is close to the first end and the first side. The second positioning magnet is close to the second end and the second side. The third positioning magnet is located between the first and second positioning magnets. The shutter is movably disposed on the main body. The fixed magnet group is disposed on the shutter, and includes first and second fixed magnets. The first fixed magnet attracts with the first positioning magnet and repels with the third positioning magnet. The second fixed magnet attracts with the second positioning magnet.

18 Claims, 10 Drawing Sheets

LENS DEVICE

CROSS-REFERENCE TO RELATED APPLICATION

This application claims the priority benefit of Taiwan application serial No. 112110719, filed on Mar. 22, 2023. The entirety of the above-mentioned patent application is hereby incorporated by reference herein and made a part of this specification.

BACKGROUND

1. Technical Field

The present disclosure relates to a lens device and, more particularly, to a shutter of a lens device.

2. Description of the Related Art

Requirements on image capturing become more demanding along with the development of communication technologies. Thus, there are various commercially available lens devices or electronic products with lens devices. These electronic devices include, for example, webcams, driving recorders, tablet computers, laptop computers and all-in-one computers.

As network security and privacy become more highly valued by users of electronic products, lens devices with shutters have also become commercially available. A shutter is disposed next to a lens and is movable to the lens to block a capturing range of the lens, further preventing secret photographing due to hackers. In general, a user needs to manually move a shutter to the position of a lens. However, for certain wider lens devices, movement paths of the shutters thereof are inevitably longer. Hence, it is frequent that the shutters stop once when moved to the proximity of the lens such that a capturing range of the lens cannot be completely blocked. Therefore, it is imperative to come up with a solution for the issue above.

SUMMARY

In view of the issue above, it is a main object of the present disclosure to provide a lens device, which solves, with a novel design of a positioning magnet group and a fixed magnet group, incomplete blocking of a shutter of a conventional lens device operated by a user.

To achieve the object above, a lens device provided by the present disclosure includes a main body, a positioning magnet group, a shutter and a fixed magnet group. The main body includes a long axis direction, a first end, a second end, and a first side and a second side opposite to each other. The first end and the second end are respectively located at two opposite ends in the long axis direction. The positioning magnet group is disposed on the main body. The positioning magnet group includes a first positioning magnet, a second positioning magnet and a third positioning magnet. The first positioning magnet is close to the first end and the first side. The second positioning magnet is close to the second end and the second side. The third positioning magnet is located between the first positioning magnet and the second positioning magnet, and is close to the first side. The shutter is movably disposed on the main body. The shutter includes a third side and a fourth side opposite to each other. The third side corresponds to the first side, and the fourth side corresponds to the second side. The fixed magnet group is disposed on the shutter. The fixed magnet group includes a first fixed magnet and a second fixed magnet. The first fixed magnet is close to the third side, and the first fixed magnet attracts with the first positioning magnet and repels with the third positioning magnet. The second fixed magnet is close to the fourth side, and attracts with the second positioning magnet.

According to an embodiment of the present disclosure, the shutter moves between the first end and the second end along the long axis direction. When the shutter is close to the first end, the first fixed magnet attracts with the first positioning magnet. When the shutter moves toward the second end, the first fixed magnet repels with the third positioning magnet; and when the shutter continues moving toward the second end, the second fixed magnet attracts with the second positioning magnet.

According to an embodiment of the present disclosure, the main body includes a central line perpendicular to the long axis direction. The third positioning magnet is located on the central line.

According to an embodiment of the present disclosure, the third positioning magnet is an elongated magnet, and a long side of the third positioning magnet is parallel to the long axis direction of the main body.

According to an embodiment of the present disclosure, the positioning magnet group further includes a fourth positioning magnet, which is located between the first positioning magnet and the second positioning magnet and close to the second side. The second fixed magnet repels with the fourth positioning magnet.

According to an embodiment of the present disclosure, the third positioning magnet and the fourth positioning magnet are disposed parallel to each other on the main body.

According to an embodiment of the present disclosure, each of the first fixed magnet and the second fixed magnet is a polygonal magnet.

According to an embodiment of the present disclosure, the fixed magnet group further includes a first metal member and a second metal member. The first metal member is disposed on a surface of the first fixed magnet opposite to the main body. The second metal member is disposed on a surface of the second fixed magnet opposite to the main body.

According to an embodiment of the present disclosure, the first fixed magnet includes a first main magnet and a first auxiliary magnet. An area of the first main magnet is greater than an area of the first auxiliary magnet. The first auxiliary magnet is disposed on one of surfaces of the first main magnet. The second fixed magnet includes a second main magnet and a second auxiliary magnet. An area of the second main magnet is greater than an area of the second auxiliary magnet. The second auxiliary magnet is disposed on one of surfaces of the second main magnet.

According to an embodiment of the present disclosure, each of the first main magnet and the second main magnet is a polygonal magnet. Each of the first auxiliary magnet and the second auxiliary magnet is a round magnet.

According to an embodiment of the present disclosure, the first fixed magnet includes a first main magnet and a first auxiliary magnet. The first main magnet includes a first through hole. The first auxiliary magnet is disposed in the first through hole, and the first main magnet is not in contact with the first auxiliary magnet. The second fixed magnet includes a second main magnet and a second auxiliary magnet. The second main magnet includes a second through hole. The second auxiliary magnet is disposed in the second through hole, and the second main magnet is not in contact with the second auxiliary magnet.

According to an embodiment of the present disclosure, each of the first main magnet and the second main magnet is a polygonal magnet. Each of the first auxiliary magnet and the second auxiliary magnet is a round magnet.

According to an embodiment of the present disclosure, the main body includes an opening. The lens device further includes a connector disposed at the opening of the main body. The connector includes at least one slide track. The third side or the fourth side of the shutter is connected to the slide track.

According to an embodiment of the present disclosure, the shutter includes at least one guide portion disposed at the third side or the fourth side. The guide portion is movably disposed in the slide track.

According to an embodiment of the present disclosure, the lens device further includes a body cover. The body cover is disposed at the opening of the main body and is located on an upper surface of the connector.

According to an embodiment of the present disclosure, the lens device further includes a shutter cover. The shutter cover is disposed on a surface of the shutter opposite to the main body.

According to an embodiment of the present disclosure, the lens device further includes a lens module. The lens module is disposed on the main body and close to the second end.

To achieve the object above, a lens device further provided by the present disclosure includes a main body, a positioning magnet group, a shutter and a fixed magnet group. The main body includes a long axis direction, a first end, a second end, and a first side and a second side opposite to each other. The first end and the second end are respectively located at two opposite ends in the long axis direction. The first side and the second side are parallel to the long axis direction. The positioning magnet group is disposed on the main body. The positioning magnet group includes a first positioning magnet, a second positioning magnet and a fourth positioning magnet. The first positioning magnet is close to the first end and the first side. The second positioning magnet is close to the second end and the second side. The fourth positioning magnet is located between the first positioning magnet and the second positioning magnet, and is close to the second side. The shutter is movably disposed on the main body. The shutter includes a third side and a fourth side opposite to each other. The third side corresponds to the first side, and the fourth side corresponds to the second side. The fixed magnet group is disposed on the shutter. The fixed magnet group includes a first fixed magnet and a second fixed magnet. The first fixed magnet is close to the third side, and attracts with the first positioning magnet. The second fixed magnet is close to the fourth side. Moreover, the second fixed magnet attracts with the second positioning magnet and repels with the fourth positioning magnet.

In continuation of the above, a lens device according to the present disclosure includes a main body, a positioning magnet group, a shutter and a fixed magnet group. The positioning magnet group is disposed on the main body, and includes a first positioning magnet, a second positioning magnet and a third positioning magnet. The third positioning magnet is located between the first positioning magnet and the second positioning magnet. The shutter is movably disposed on the main body. The fixed magnet group is disposed on the shutter, and includes a first fixed magnet and a second fixed magnet. When the shutter moves between the first end and the second end of the main body, since the first fixed magnet attracts with the first positioning magnet and the second fixed magnet attracts with the second positioning magnet, the shutter can be positioned to an open position (for example, the first end) or a closed position (for example, the second end). With the design of repulsion between the first fixed magnet and the third positioning magnet, when the first fixed magnet gets close to the third positioning magnet, a user can sense the force of the repulsion, further reminding the user that a correct position is not yet reached (i.e., the closed position or the open position), as well as preventing the shutter having merely moved to halfway from being misjudged as having moved to the closed position.

DETAILED DESCRIPTION OF THE EMBODIMENTS

In order to make the structure, characteristics, and effectiveness of the disclosure further understood and recognized, a detailed description of the disclosure is provided as follows, along with embodiments and accompanying figures.

Figure 1:
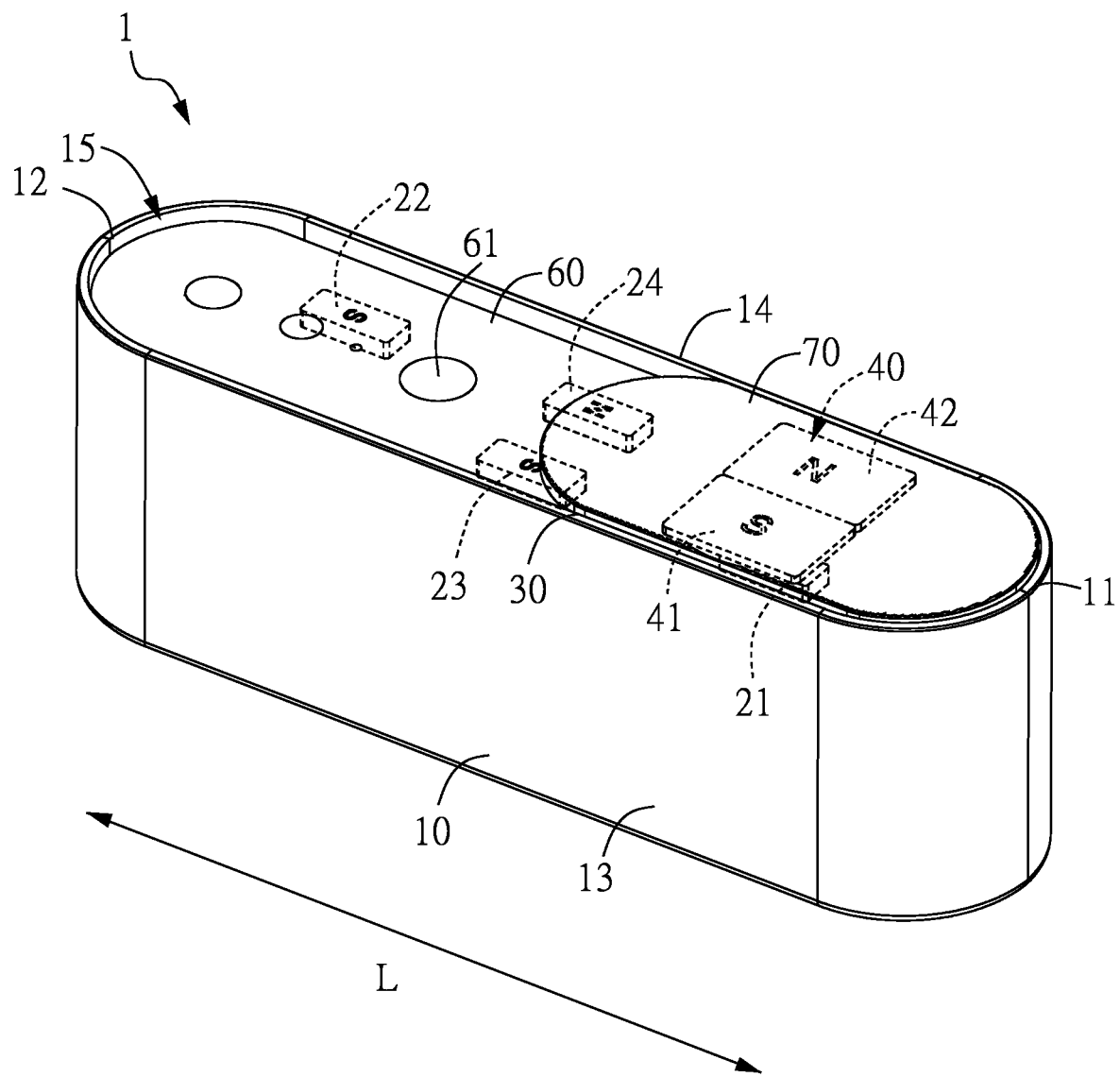
FIG. 1 is a schematic diagram of a lens device according to a first embodiment of the present disclosure.
Figure 2:
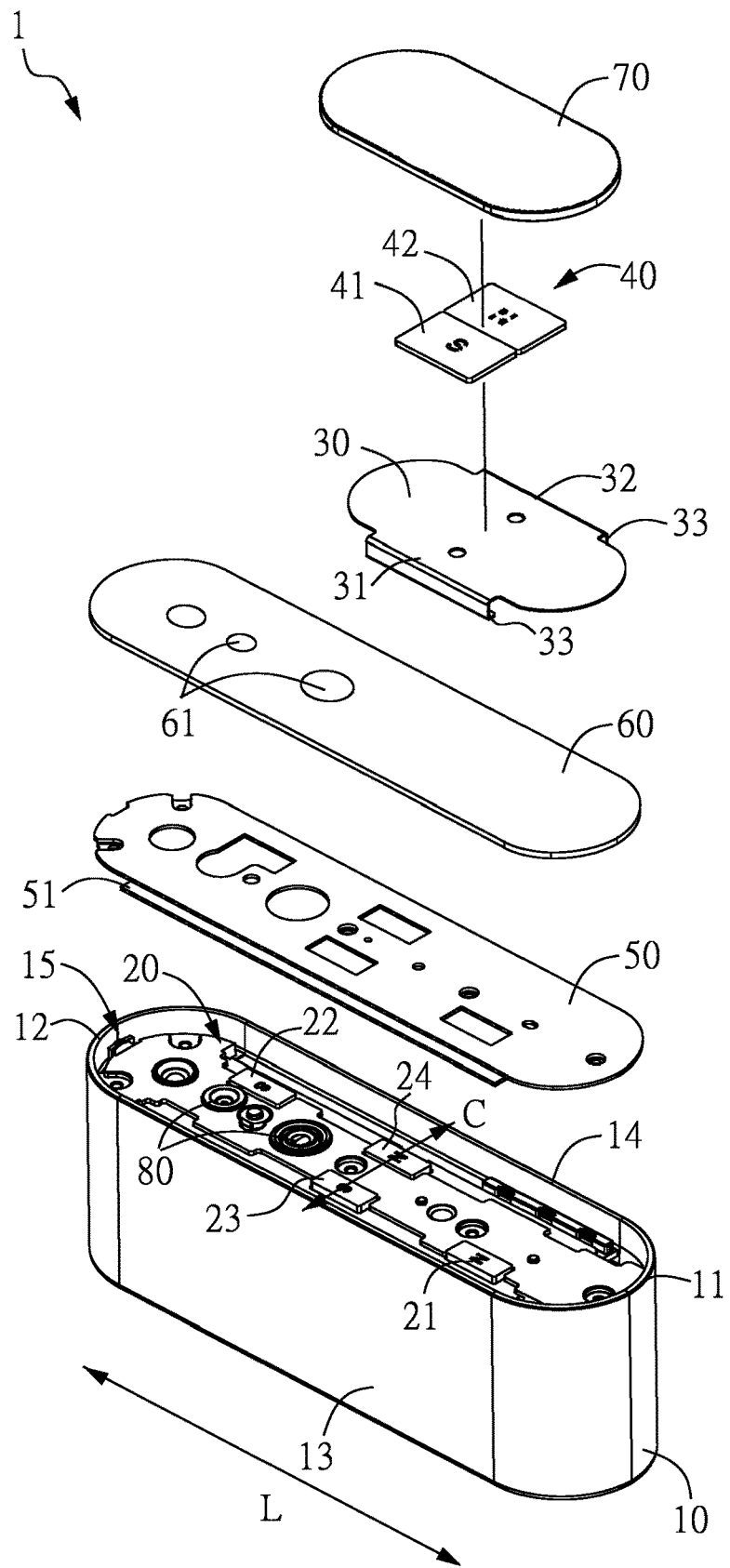
FIG. 2 is an exploded schematic diagram of the lens device of FIG. 1.
Figure 3:
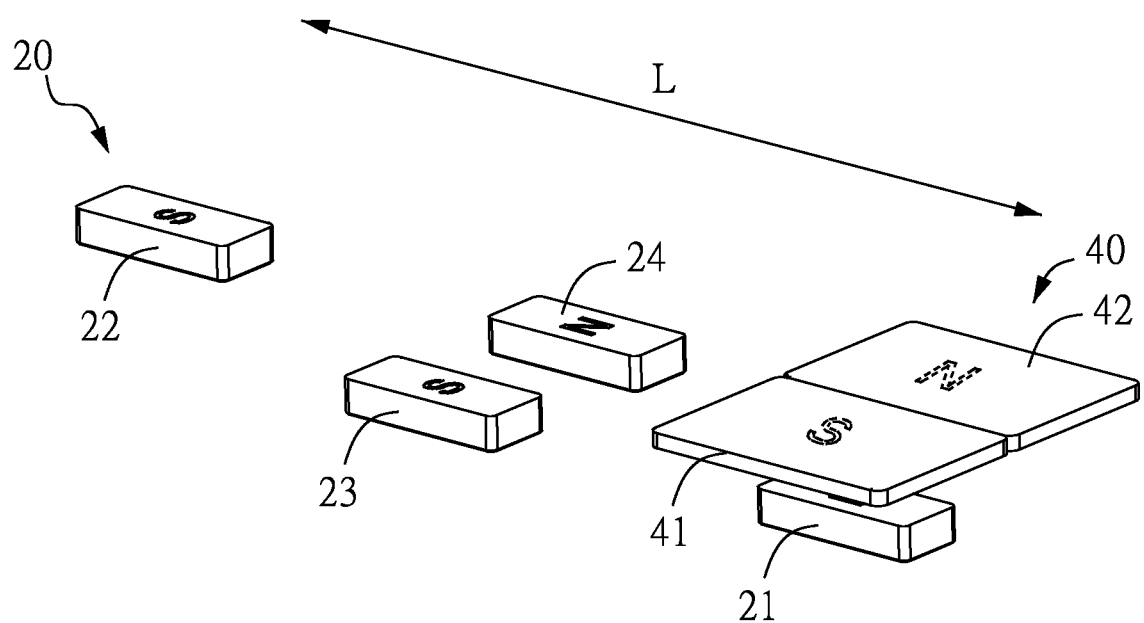
FIG. 3 is a schematic diagram of the positioning magnet group and the fixed magnet group in FIG. 1.

FIG. 1 shows a schematic diagram of a lens device according to a first embodiment of the present disclosure. FIG. 2 shows an exploded schematic diagram of the lens device of FIG. 1. FIG. 3 shows a schematic diagram of the positioning magnet group and the fixed magnet group in FIG. 1. Refer to FIG. 1, FIG. 2 and FIG. 3. First of all, a lens device 1 of this embodiment is a web cam, for example. In other embodiments, the lens device 1 can also be a lens device 1 applied to an electronic product such as a driving recorder, a tablet computer, a laptop computer or an all-in-one computer. In this embodiment, the lens device 1 includes a main body 10, a positioning magnet group 20, a shutter 30 and a fixed magnet group 40.

The lens device 1 of this embodiment is a wider lens device 1, and so the main body 10 includes a long axis direction L. Moreover, the main body 10 includes a first end 11, a second end 12, and a first side 13 and a second side 14. The first end 11 and the second end 12 are respectively located at two opposite ends in the long axis direction L. The first side 13 and the second side 14 are two opposite sides of the main body 10. Preferably, the main body 10 can be a rectangular prism, such that the first side 13 and the second side 14 are adjacent to the first end 11 and the second end 12, and the first side 13 and the second side 14 are parallel to the long axis direction L.

The positioning magnet group 20 is disposed on the main body 10. The positioning magnet group 20 includes a first positioning magnet 21, a second positioning magnet 22 and a third positioning magnet 23. As shown in FIG. 2, the first positioning magnet 21 is close to the first end 11 and the first side 13 of the main body 10, and the second positioning magnet 22 is close to the second end 12 and the second side 14. That is, the first positioning magnet 21 and the second positioning magnet 22 are symmetrically disposed on the main body 10. Moreover, the third positioning magnet 23 is located between the first positioning magnet 21 and the second positioning magnet 22, and is close to the first side 13.

The shutter 30 is movably disposed on the main body 10. The shutter 30 includes a third side 31 and a fourth side 32 opposite to each other. The third side 31 corresponds to the first side 13, and the fourth side 32 corresponds to the second side 14. That is, when the shutter 30 is assembled to the main body 10, the third side 31 of the shutter 30 is adjacent to the first side 13 of the main body 10, and the fourth side 32 of the shutter 30 is adjacent to the second side 14 of the main body 10. Moreover, lengths of the first side 13 and the second side 14 are greater than lengths of the third side 31 and the fourth side 32. Preferably, the length of the first side 13 can be twice the length of the third side 31. Similarly, the length of the second side 14 can be twice the length of the fourth side 32. Thus, the shutter 30 can be slidably disposed on the main body 10, and is movable between the first end 11 and the second end 12.

Figure 4:
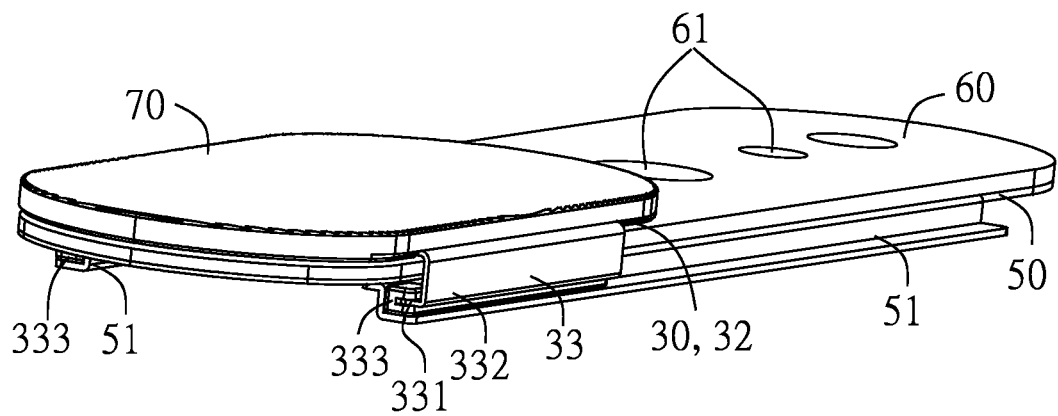
FIG. 4 is an assembly schematic diagram of the shutter cover, the shutter, the body cover and the connector in FIG. 1.

FIG. 4 shows an assembly schematic diagram of the shutter cover, the shutter, the body cover and the connector in FIG. 1. Refer to FIG. 1, FIG. 2 and FIG. 4. More specifically, the main body 10 of this embodiment includes an opening 15. Preferably, the lens device 1 further includes a connector 50 which is disposed at the opening 15. The form of the connector 50 matches that of opening 15 of the main body 10; for example, both of the connector 50 and the opening 15 are similar to rectangles with two arc ends. Moreover, the connector 50 of this embodiment is used to connect the shutter 30, so that the shutter 30 can be connected to the connector 50 and hence disposed on the main body 10. For example, the connector 50 can include a fastening structure for connecting the shutter 30, further assembling the shutter 30 on the lens device 1. Preferably, the connector 50 includes at least one slide track 51 located on a long side of the connector 50. Preferably, the connector 50 of this embodiment includes two slide tracks 51 respectively located on two opposite long sides of the connector 50, so as to respectively connect the third side 31 and the fourth side 32 of the shutter 30 to provide a more stable movement effect. More specifically, the shutter 30 is disposed above the connector 50, and the third side 31 and the fourth side 32 are respectively connected to the two slide tracks 51 of the connector 50, allowing the shutter 30 to be movable relative to the connector 50. In addition, since the connector 50 is disposed at the opening 15 of the main body 10, the shutter 30 also moves relative to the main body 10 while moving relative to the connector 50.

In this embodiment, the slide track 51 of the connector 50 is a track facing an exterior side. Correspondingly, the shutter 30 of this embodiment also includes two guide portions 33 respectively disposed on the third side 31 and the fourth side 32. The guide portions 33 are movably disposed in the slide tracks 51, such that the third side 31 and the fourth side 32 of the shutter 30 are connected to the two slide tracks 51 of the connector 50. As shown in FIG. 4, in this embodiment, the guide portion 33 has a protrusion 331 protruding toward an interior side, and can be further placed into the slide track 51 facing the exterior side. More specifically, the guide portion 33 of this embodiment includes the protrusion 331 and an extension 332. The extension 332 is a portion of the guide portion 33 extending downward from each of the third side 31 and the fourth side 32, and the protrusion 331 is a portion protruding from an end of the extension 332 toward the interior side of the shutter 30. When the shutter 30 is disposed above the connector 50, the extension 332 is located on an exterior side of the connector 50, and the protrusion 331 is accommodated in the slide track 51.

Preferably, the shutter 30 and the connector 50 can be made of a robust metal material to enhance the structural strength of the shutter 30 and the connector 50. Preferably, the guide portion 33 can further include an anti-slip portion 333 disposed on an exterior side of the protrusion 331, as shown in FIG. 4. The anti-slip portion 333 and the protrusion 331 are both disposed in the slide track 51, and the anti-slip portion 333 is in contact with the slide track 51. The anti-slip portion 333 may be made of a plastic material, which is, for example but not limited to, polyoxymethylene (POM). With the anti-slip portion 333 provided, a force of friction between the guide portion 33 and the slide track 51 (made of a metal material) is increased, further improving a user experience in operating/moving the shutter 30.

In other embodiments, the two slide tracks 51 of the connector 50 can also be grooves extending upwards and facing an interior side, so that the third side 31 and the fourth side 32 of the shutter 30 can be directly placed into the two slide tracks 51 of the connector 50. In other embodiments, the connector 50 can be configured to include the slide track 51 on only one long side and be connected to the third side 31 or the fourth side 32 of the shutter 30, similarly achieving an effect of enabling the shutter 30 to be movable relative to the connector 50 and the main body 10. It should be noted that the present disclosure is not limited to the examples above.

Preferably, the lens device 1 further includes a body cover 60 and a shutter cover 70. The body cover 60 is disposed in the opening 15 of the main body 10 and is located on an upper surface of the connector 50. A profile of the body cover 60 is substantially the same as that of the opening 15 of the main body 10. More specifically, in this embodiment, the body cover 60 is a board having a shape similar to a rectangle with two arc ends. The body cover 60 is disposed on the upper surface of the connector 50, and exterior sidewalls of the connector 50 and the body cover 60 are partially located on an interior side of the extension 332. In other words, the guide portion 33 of the shutter 30 is concurrently fastened with the connector 50 and the body cover 60.

In this embodiment, the body cover 60 is for blocking the connector 50 and an internal structure of the main body 10, and is at the same time for covering the positioning magnet group 20 disposed on the main body 10. Thus, the positioning magnet group 20 covered by the body cover 60 is indicated by dotted lines in FIG. 1 and FIG. 5 and FIG. 7 described below. For example, the lens device 1 further includes at least one lens module 80, and an example of two lens modules 80 is used herein. The lens modules 80 are disposed on the main body 10 and close to the second end 12. Correspondingly, the body cover 60 includes lens openings 61 at positions close to the second end 12, so as to correspond to the lens modules 80. Thus, the shutter 30 located at the first end 11 is at an open position, and the lens modules 80 can operate normally; the shutter 30 located at the second end 12 is at a closed position, and the lens modules 80 are blocked by the shutter 30 and thus capturing cannot be performed.

Moreover, the shutter cover 70 is disposed on a surface of the shutter 30 opposite to the main body 10. That is, the shutter cover 70 is disposed on an upper surface of the shutter 30. Preferably, the body cover 60 and the shutter cover 70 are made of materials different from those of the shutter 30 and the connector 50. Specifically, the body cover 60 and the shutter cover 70 can be made of plastic materials, and can be designed with different colors or patterns according to requirements. Preferably, the body cover 60 and the shutter cover 70 can be in deep colors, so as to avoid direct viewing of an internal structure of the lens device 1. Further, because the body cover 60 is disposed on the upper surface of the connector 50 and the shutter cover 70 is disposed on the upper surface of the shutter 30, the lens device 1 in overall is provided with better aesthetic values. It should be noted that, since the shutter 30 is disposed on a lower surface of the shutter cover 70, the shutter 30 is depicted on a bottom edge of the shutter cover 70 in FIG. 1 and FIG. 4.

Referring to FIG. 1 and FIG. 2, the fixed magnet group 40 is disposed on the shutter 30. The fixed magnet group 40 of this embodiment is disposed between the shutter 30 and the shutter cover 70, and is thus located between the upper surface of the shutter 30 and the lower surface of the shutter cover 70. In other embodiments, the fixed magnet group 40 can also be disposed on a lower surface of the shutter 30; the present disclosure is not limited to the examples above. The fixed magnet group 40 includes a first fixed magnet 41 and a second fixed magnet 42. The first fixed magnet 41 is close to the third side 31 of the shutter 30, and the second fixed magnet 42 is close to the fourth side 32. Thus, when the shutter 30 moves between the first end 11 and the second end 12 of the main body 10 along the long axis direction L, the first fixed magnet 41 gets close to each of the first positioning magnet 21 and the third positioning magnet 23, and the second fixed magnet 42 gets close to the second positioning magnet 22.

In this embodiment, the first fixed magnet 41 attracts with the first positioning magnet 21 and repels with the third positioning magnet 23, and the second fixed magnet 42 attracts with the second positioning magnet 22. More specifically, a polarity of the first fixed magnet 41 is different from a polarity of the first positioning magnet 21, and the two thus attract with each other. A polarity of the second fixed magnet 42 is different from a polarity of the second positioning magnet 22, and the two thus attract with each other. The polarity of the first fixed magnet 41 is the same as a polarity of the third positioning magnet 23, and the two thus repel with each other. For example, the polarities of the first positioning magnet 21 and the second fixed magnet 42 are the N polarity, and the polarities of the second positioning magnet 22, the third positioning magnet 23 and the first fixed magnet 41 are the S polarity. It should be noted that, the polarities on two sides of a magnet are different, and the polarity herein refers to the polarity of the side of the positioning magnet group 20 toward the shutter 30, and the polarity of the side of the fixed magnet group 40 toward the main body 10. From the perspective of the drawings, the polarities refer to the polarity of an upper surface of the positioning magnet group 20 and the polarity of a lower surface of the fixed magnetic group 40. Thus, the polarity of the fixed magnet group 40 in FIG. 2 and FIG. 4 (as well as FIG. 6 and FIG. 8 below) is indicated by dotted lines. Because the fixed magnet group 40 is blocked by the shutter 30 in FIG. 1 as well as FIG. 5 and FIG. 7 below, the fixed magnet group 40 and the polarities thereof are similarly indicated by dotted lines.

Figure 5:
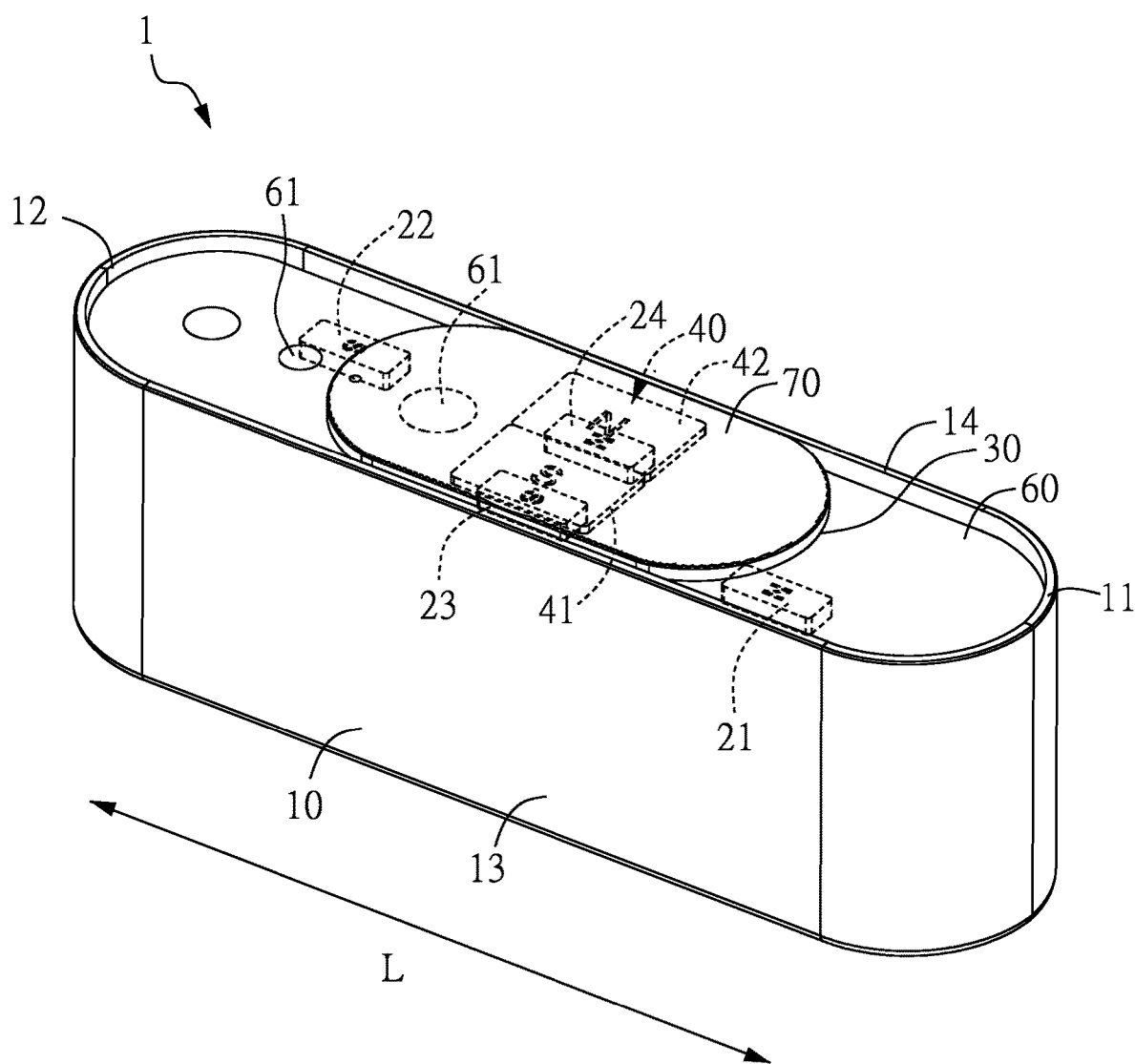
FIG. 5 is a schematic diagram of movement of the shutter in FIG. 1.
Figure 6:
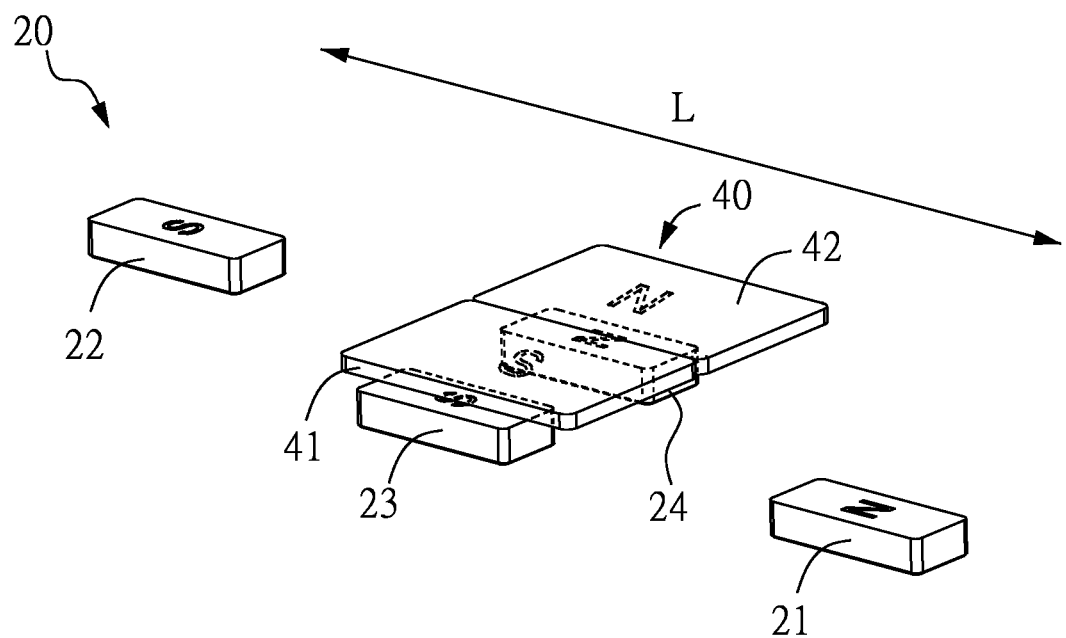
FIG. 6 is a schematic diagram of the positioning magnet group and the fixed magnet group in FIG. 5.

When the shutter 30 is located at the first end 11 of the main body 10 (i.e., at the open position), the first fixed magnet 41 and the first positioning magnet 21 overlap each other in the vertical direction, as shown in FIG. 1 and FIG. 3. At this point in time, the first fixed magnet 41 attracts with the first positioning magnet 21, so that the shutter 30 can be fixed at the open position. When a lens needs to be blocked, a user can apply a force on the shutter 30 to move the shutter 30 toward the second end 12 along the long axis direction L. FIG. 5 shows a schematic diagram of movement of the shutter in FIG. 1. FIG. 6 shows a schematic diagram of the positioning magnet group and the fixed magnet group in FIG. 5. Refer to FIG. 5 and FIG. 6. When the first fixed magnet 41 gets close to the third positioning magnet 23, the first fixed magnet 41 and the third positioning magnet 23 repel with each other since they have the same polarity (both are the S polarity). At this point in time, the user can sense the force of repulsion, so that the user is reminded that the shutter 30 has not yet reached the closed position.

Figure 7:
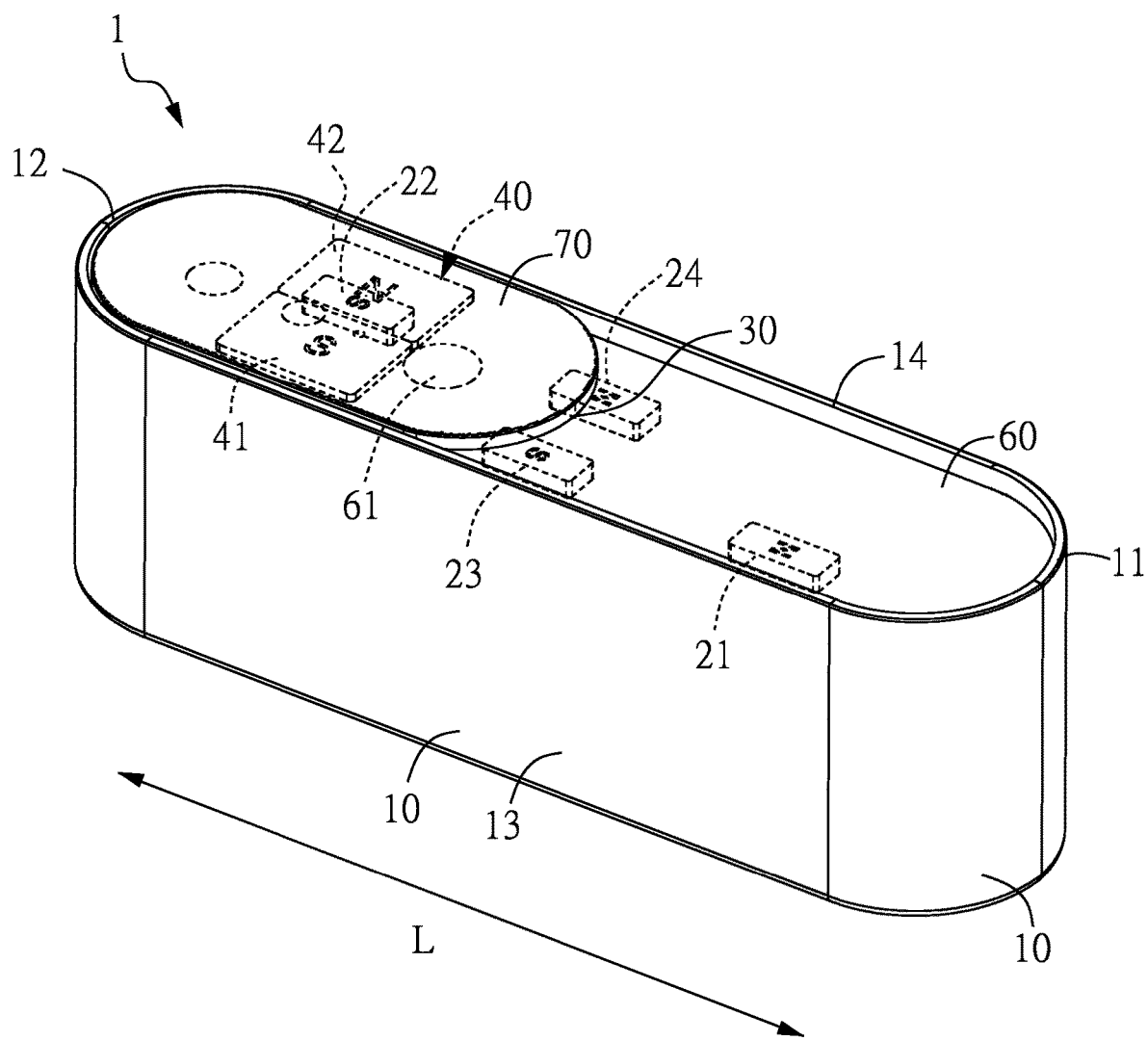
FIG. 7 is a schematic diagram of moving the shutter in FIG. 5 to a closed position.
Figure 8:
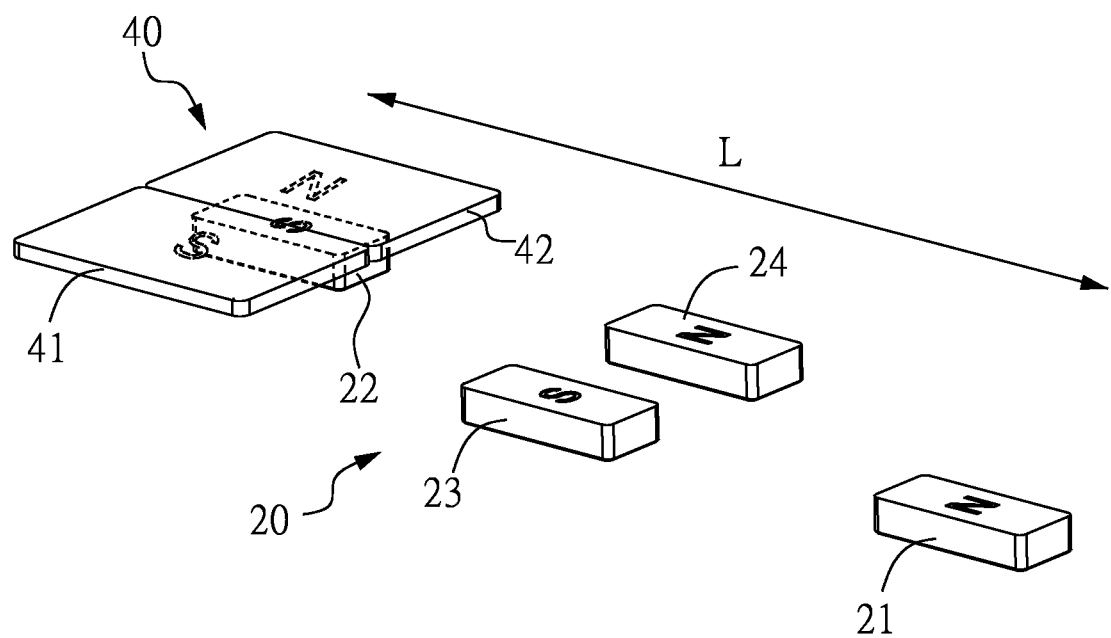
FIG. 8 is a schematic diagram of the positioning magnet group and the fixed magnet group in FIG. 7.

Next, the user needs to continue applying the force upon the shutter 30 toward a direction of the second end 12, so as to continue moving the shutter 30 toward the second end 12. When the second fixed magnet 42 gets close to the second positioning magnet 22, since the second fixed magnet 42 and the second positioning magnet 22 have different polarities, the shutter 30 can then be guided to the second end 12 (i.e., the closed position) by means of the force of mutual attraction, as shown in FIG. 7 and FIG. 8. FIG. 7 shows a schematic diagram of moving the shutter in FIG. 5 to a closed position. FIG. 8 shows a schematic diagram of the positioning magnet group and the fixed magnet group in FIG. 7. At this point in time, the second fixed magnet 42 and the second positioning magnet 22 overlap with each other in the vertical direction, and the shutter 30 blocks the lens openings 61 of the body cover 60, further blocking image capturing ranges of the lens modules 80 (referring to FIG. 2).

Thus, with the third positioning magnet 23 provided as well as the design of mutual repulsion between the first fixed magnet 41 and the third positioning magnet 23, an effect of reminding the user can be achieved. Moreover, if the user stops applying a force while the shutter 30 is moved to only halfway (as shown in FIG. 5 and FIG. 6), the shutter 30 is pulled back to the first end 11 (i.e., the open position) because the first fixed magnet 41 attracts with the first positioning magnet 21. Thus, the user is still able to observe in an obvious way that the shutter 30 has not yet blocked the lens openings 61. In comparison with a conventional lens device, an issue of misjudging the shutter 30 having merely moved to halfway as having moved to the closed position can be eliminated.

Similarly, when the lens modules 80 are used, the user needs to move the shutter 30 from the second end 12 (i.e., the closed position) to the first end 11 (i.e., the open position). When the first fixed magnet 41 gets close to the third positioning magnet 23, a force of repulsion is also generated to remind the user that the shutter 30 has not yet moved to the open position, and a force for moving toward the first end 11 needs to be continually applied. Thus, an issue of misjudging the shutter 30 having merely moved to halfway as having moved to the open position can similarly be eliminated. The relation between the positioning magnet group 20 and the fixed magnet group 40 during the movement of the shutter 30 can be directly referred from the description above, and related details are thus omitted herein.

Referring to FIG. 2, the main body 10 includes a central line C perpendicular to the long axis direction L. Specifically, the central line C refers to a midpoint between the first end 11 and the second end 12 and a straight line direction perpendicular to the long axis direction L. In other words, the central line C is also a midpoint position of the movement of the shutter 30 between the first end 11 and the second end 12. Preferably, the third positioning magnet 23 is located on the central line C. It should be noted that, the above refers to that a central point of the third positioning magnet 23 is located on the central line C. In one embodiment, the third positioning magnet 23 can be a round magnet or an ellipsoidal magnet, and has a central point located on the central line C. Preferably, the third positioning magnet 23 of this embodiment is an elongated magnet. In this embodiment, the central point of the third positioning magnet 23 (i.e., an elongated magnet) is located on the central line C, and long sides of the third positioning magnet 23 are parallel to the long axis direction L of the main body 10. Preferably, both of the first positioning magnet 21 and the third positioning magnet 23 can be elongated magnets. In comparison with a round magnet, the distribution of magnetic field lines of an elongated magnet is broader, and better forces of repulsion and attraction can be produced.

Preferably, the positioning magnet group 20 further includes a fourth positioning magnet 24, which is located between the first positioning magnet 21 and the second positioning magnet 22 and close to the second side 14. The second fixed magnet 42 repels with the fourth positioning magnet 24. That is, the polarity of the second fixed magnet 42 is the same as a polarity of the fourth positioning magnet 24, and both are the N polarity, for example. Preferably, the third positioning magnet 23 and the fourth positioning magnet 24 are disposed parallel to each other on the main body 10. In this embodiment, a shape of the fourth positioning magnet 24 is the same as a shape of the third positioning magnet 23, and central points of the fourth positioning magnet 24 and the third positioning magnet 23 are also located on the central line C of the main body 10. Thus, when the shutter 30 moves to halfway (as shown in FIG. 5 and FIG. 6), in addition to the force of repulsion produced by the first fixed magnet 41 and the third positioning magnet 23, the second fixed magnet 42 and the fourth positioning magnet 24 also produce a force of repulsion in between, enabling the user to sense an even greater force of repulsion to enhance the sense of touch used for reminding purposes. In other embodiments, the third positioning magnet 23 or the fourth positioning magnet 24 can be selected in the alternative way, and the selected one corresponds to each of the first fixed magnet 41 and the second fixed magnet 42; the present disclosure is not limited to the examples above.

In this embodiment, each of the first fixed magnet 41 and the second fixed magnet 42 is a polygonal magnet. For example, each of the first fixed magnet 41 and the second fixed magnet 42 is a square and flat magnet. In other embodiments, the first fixed magnet 41 and the second fixed magnet 42 can also have other shapes or structures, and such are not specifically defined by the present disclosure.

Figure 9:
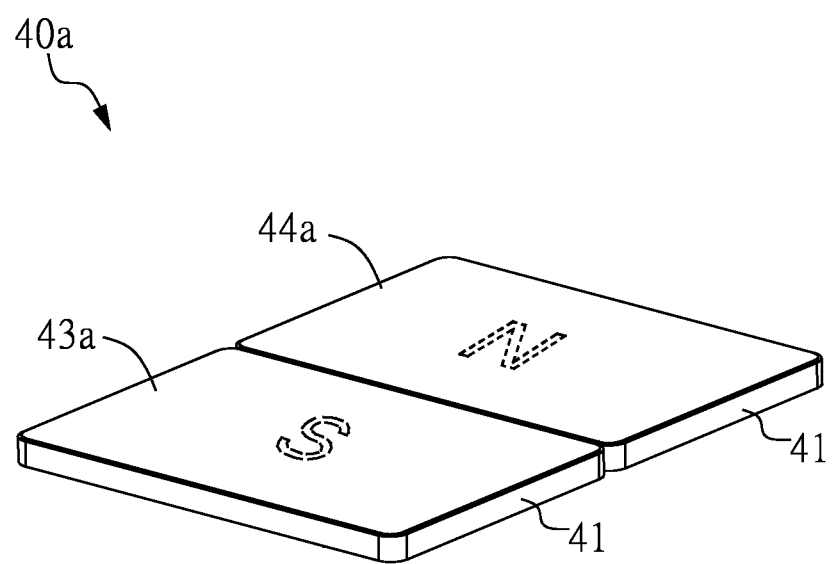
FIG. 9 is a schematic diagram of a fixed magnet group according to a second embodiment of the present disclosure.

FIG. 9 shows a schematic diagram of a fixed magnet group according to a second embodiment of the present disclosure. Refer to FIG. 9. A fixed magnet group 40a of this embodiment includes a first fixed magnet 41, a second fixed magnet 42, a first metal member 43a and a second metal member 44a. The structures and the polarities of the first fixed magnet 41 and the second fixed magnet 42 are the same as those of the first embodiment, so the same numerals and symbols are used. As described in the embodiment above, the polarity of the fixed magnet group 40a shown in FIG. 9 also refers to the polarity of the lower surface and is thus indicated by dotted lines. The first metal member 43a is disposed on a surface of the first fixed magnet 41 opposite to the main body 10 (i.e., an upper surface), and the second metal member 44a is disposed on a surface of the second fixed magnet 42 opposite to the main body 10 (i.e., an upper surface).

Preferably, the first metal member 43a and the second metal member 44a are tin-plated iron (or referred to as tin plate), which are respectively disposed on the upper surfaces of the first fixed magnet 41 and the second fixed magnet 42 to increase magnetic forces of opposite surfaces (i.e., lower surfaces). That is, with the first metal member 43a and the second metal member 44a provided, the magnetic forces of surfaces (i.e., lower surfaces) of the first fixed magnet 41 and the second fixed magnet 42 facing the main body 10 can be increased, further increasing the force of attraction or repulsion with the positioning magnet group 20. The structures and arrangement positions of the positioning magnet group 20 can be referred from the description of the first embodiment, and such repeated details are omitted herein. It should be noted that, the polarities of the first fixed magnet 41 and the second fixed magnet 42 shown in FIG. 9 are indicated at the first metal member 43a and the second metal member 44a.

Figure 10:
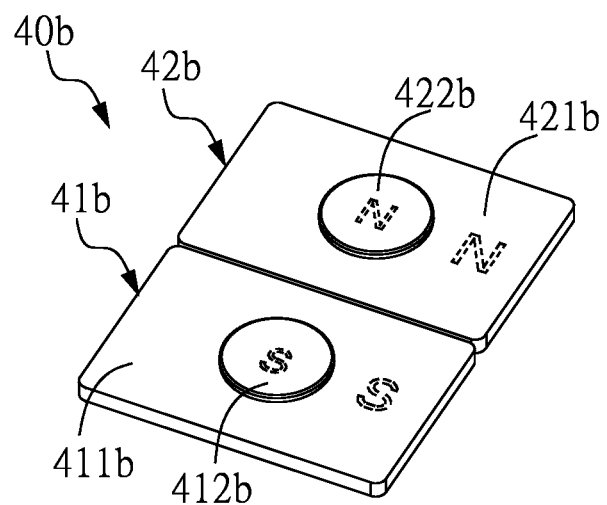
FIG. 10 is a schematic diagram of a fixed magnet group according to a third embodiment of the present disclosure.

FIG. 10 shows a schematic diagram of a fixed magnet group according to a third embodiment of the present disclosure. Refer to FIG. 10. As described in the embodiment above, the polarity of a fixed magnet group 40b shown in FIG. 10 also refers to the polarity of the lower surface and is thus indicated by dotted lines. In this embodiment, the fixed magnet group 40b includes a first fixed magnet 41b and a second fixed magnet 42b. Moreover, the first fixed magnet 41b further includes a first main magnet 411b and a first auxiliary magnet 412b. An area of the first main magnet 411b is greater than an area of the first auxiliary magnet 412b. The first auxiliary magnet 412b is disposed on one of surfaces of the first main magnet 411b, and can be disposed on an upper surface or a lower surface of the first main magnet 411b. Similarly, the second fixed magnet 42b includes a second main magnet 421b and a second auxiliary magnet 422b. An area of the second main magnet 421b is greater than an area of the second auxiliary magnet 422b. The second auxiliary magnet 422b is disposed on one of surfaces of the second main magnet 421b, and can similarly be disposed on an upper surface or a lower surface of the second main magnet 421b.

In this embodiment, the first main magnet 411b and the second main magnet 421b can be polygonal magnets, for example, square and flat magnets same as the first fixed magnet 41 and the second fixed magnet 42 of the embodiment above. Each of the first auxiliary magnet 412b and the second auxiliary magnet 422b can be a round magnet with a smaller area. Preferably, the first auxiliary magnet 412b is disposed at a center of one of surfaces of the first main magnet 411b, and the second auxiliary magnet 422b is disposed at a center of one of surfaces of the second main magnet 421b. For example, a center of a round magnet (i.e., the first auxiliary magnet 412b or the second auxiliary magnet 422b) corresponds to a center of a square magnet (i.e., the first main magnet 411b or the second main magnet 421b).

Thus, the first fixed magnet 41b and the second fixed magnet 42b are two-layered structures. Moreover, by disposing the first auxiliary magnet 412b with a smaller area on the first main magnet 411b and disposing the second auxiliary magnet 422b with a smaller area on the second main magnet 421b, respective positioning effects of the first fixed magnet 41b and the second fixed magnet 42b with the first positioning magnet 21 and the second positioning magnet 22 can be enhanced. The structures and arrangement positions of the first positioning magnet 21 and the second positioning magnet 22 can be referred from the description of the first embodiment, and such repeated details are omitted herein.

Figure 11:
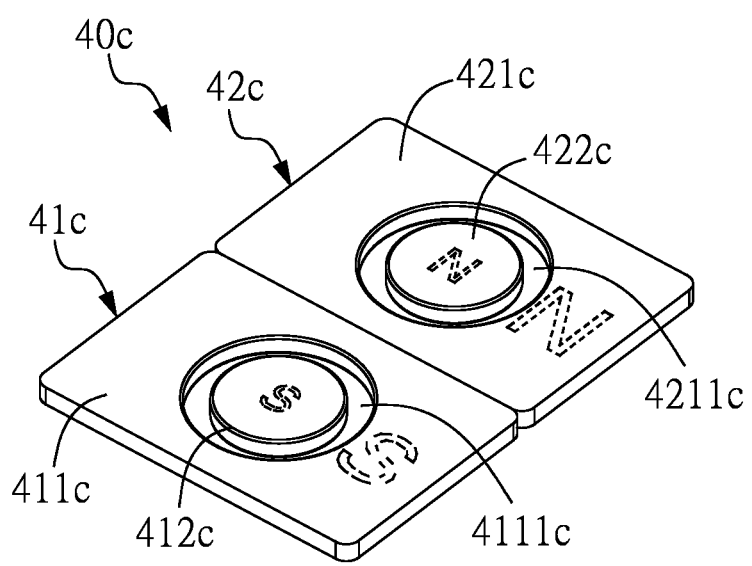
FIG. 11 is a schematic diagram of a fixed magnet group according to a fourth embodiment of the present disclosure.

FIG. 11 shows a schematic diagram of a fixed magnet group according to a fourth embodiment of the present disclosure. Refer to FIG. 11. As described in the embodiment above, the polarity of a fixed magnet group 40c shown in FIG. 11 also refers to the polarity of the lower surface and is thus indicated by dotted lines. In this embodiment, the fixed magnet group 40c includes a first fixed magnet 41c and a second fixed magnet 42c. The first fixed magnet 41c also includes a first main magnet 411c and a first auxiliary magnet 412c. The second fixed magnet 42c includes a second main magnet 421c and a second auxiliary magnet 422c. The difference from the third embodiment lies in that, the first main magnet 411c further includes a first through hole 4111c. The first auxiliary magnet 412c is disposed in the first through hole 4111c, and the first main magnet 411c is not in contact with the first auxiliary magnet 412c. Correspondingly, the second main magnet 421c also includes a second through hole 4211c. The second auxiliary magnet 422c is disposed in the second through hole 4211c, and the second main magnet 421c is not in contact with the second auxiliary magnet 422c.

In this embodiment, the first main magnet 411c and the second main magnet 421c can similarly be polygonal magnets, for example, square and flat magnets as those of the embodiments above. The first main magnet 411c and the second main magnet 421c respectively include the first through hole 4111c and the second through 4211c that are circular at center positions thereof. Correspondingly, each of the first auxiliary magnet 412c and the second auxiliary magnet 422c can be a round magnet with a smaller area. That is, an area of the first through hole 4111c and an area of the second through hole 4211c are greater than an area of the first auxiliary magnet 412c and an area of the second auxiliary magnet 422c. Thus, when the first auxiliary magnet 412c is placed into the first through hole 4111c, the first auxiliary magnet 412c is not in contact with the first main magnet 411c, and an annular hole can be formed. Similarly, when the second auxiliary magnet 422c is placed into the second through hole 4211c, the second auxiliary magnet 422c is not in contact with the second main magnet 421c, and an annular hole can be formed. With the first auxiliary magnet 412c and the second auxiliary magnet 422c having annular holes at peripheries, respective positioning effects of the first fixed magnet 41c and the second fixed magnet 42c with the first positioning magnet 21 and the second positioning magnet 22 can also be enhanced. The structures and arrangement positions of the first positioning magnet 21 and the second positioning magnet 22 can be referred from the description of the first embodiment, and such repeated details are omitted herein.

In conclusion of the above, a lens device according to the present disclosure includes a main body, a positioning magnet group, a shutter and a fixed magnet group. The positioning magnet group is disposed on the main body, and includes a first positioning magnet, a second positioning magnet and a third positioning magnet. The third positioning magnet is located between the first positioning magnet and the second positioning magnet. The shutter is movably disposed on the main body. The fixed magnet group is disposed on the shutter, and includes a first fixed magnet and a second fixed magnet. When the shutter moves between the first end and the second end of the main body, since the first fixed magnet attracts with the first positioning magnet and the second fixed magnet attracts with the second positioning magnet, the shutter can be positioned to an open position (for example, the first end) or a closed position (for example, the second end). With the design of repulsion between the first fixed magnet and the third positioning magnet, when the first fixed magnet gets close to the third positioning magnet, a user can sense the force of repulsion, further reminding a user that a correct position is not yet reached (i.e., the closed position or the open position), as well as preventing the shutter having merely moved to halfway from being misjudged as having moved to the closed position.

Moreover, the positioning magnet group can further include a fourth positioning magnet, which is located between the first positioning magnet and the second positioning magnet, and the second fixed magnet repels with the fourth positioning magnet. The fourth positioning magnet can be used in substitution for the third positioning magnet, as an element for producing a force of repulsion for reminding a user. Alternatively, the positioning magnet group can include both the third positioning magnet and the fourth positioning magnet.

Although the present disclosure has been explained in relation to its preferred embodiments, it is to be understood that many other possible modifications and variations can be made without departing from the spirit and scope of the disclosure as hereinafter claimed.

What is claimed is:

1. A lens device, comprising:
   a main body, comprising a long axis direction, a first end, a second end, and a first side and a second side opposite to each other, wherein the first end and the second end are respectively located at two opposite ends in the long axis direction;
   a positioning magnet group, disposed on the main body, the positioning magnet group comprising:
   a first positioning magnet, close to the first end and the first side;
   a second positioning magnet, close to the second end and the second side; and
   a third positioning magnet, located between the first positioning magnet and the second positioning magnet, and close to the first side;
   a shutter, movably disposed on the main body, the shutter comprising a third side and a fourth side opposite to each other, wherein the third side corresponds to the first side and the fourth side corresponds to the second side; and
   a fixed magnet group, disposed on the shutter, the fixed magnet group comprising:
   a first fixed magnet, close to the third side, the first fixed magnet attracting with the first positioning magnet and repelling with the third positioning magnet; and
   a second fixed magnet, close to the fourth side, the second fixed magnet attracting with the second positioning magnet.

2. The lens device according to claim 1, wherein the shutter moves between the first end and the second end along the long axis direction; when the shutter moves close to the first end, the first fixed magnet attracts with the first positioning magnet; when the shutter moves toward the second end, the first fixed magnet repels with the third positioning magnet; and when the shutter continues moving toward the second end, the second fixed magnet attracts with the second positioning magnet.

3. The lens device according to claim 1, wherein the main body comprises a central line perpendicular to the long axis direction, and the third positioning magnet is located on the central line.

4. The lens device according to claim 1, wherein the third positioning magnet is an elongated magnet, and a long side of the third positioning magnet is parallel to the long axis direction of the main body.

5. The lens device according to claim 1, wherein the positioning magnet group further comprises:
 a fourth positioning magnet, located between the first positioning magnet and the second positioning magnet and close to the second side, wherein the second fixed magnet repels with the fourth positioning magnet.

6. The lens device according to claim 5, wherein the third positioning magnet and the fourth positioning magnet are disposed parallel to each other on the main body.

7. The lens device according to claim 1, wherein each of the first fixed magnet and the second fixed magnet is a polygonal magnet.

8. The lens device according to claim 1, wherein the fixed magnet group further comprises a first metal member and a second metal member, the first metal member is disposed on a surface of the first fixed magnet opposite to the main body, and the second metal member is disposed on a surface of the second fixed magnet opposite to the main body.

9. The lens device according to claim 1, wherein the first fixed magnet comprises a first main magnet and a first auxiliary magnet, an area of the first main magnet is greater than an area of the first auxiliary magnet, and the first auxiliary magnet is disposed on one of surfaces of the first main magnet; the second fixed magnet comprises a second main magnet and a second auxiliary magnet, an area of the second main magnet is greater than an area of the second auxiliary magnet, and the second auxiliary magnet is disposed on one of surfaces of the second main magnet.

10. The lens device according to claim 9, wherein each of the first main magnet and the second main magnet is a polygonal magnet, and each of the first auxiliary magnet and the second auxiliary magnet is a round magnet.

11. The lens device according to claim 1, wherein the first fixed magnet comprises a first main magnet and a first auxiliary magnet, the first main magnet comprises a first through hole, the first auxiliary magnet is disposed in the first through hole, and the first main magnet is not in contact with the first auxiliary magnet; the second fixed magnet comprises a second main magnet and a second auxiliary magnet, the second main magnet comprises a second through hole, the second auxiliary magnet is disposed in the second through hole, and the second main magnet is not in contact with the second auxiliary magnet.

12. The lens device according to claim 11, wherein each of the first main magnet and the second main magnet is a polygonal magnet, and each of the first auxiliary magnet and the second auxiliary magnet is a round magnet.

13. The lens device according to claim 1, wherein the main body comprises an opening, the lens device further comprises a connector disposed at the opening of the main body, the connector comprises at least one slide track, and the third side or the fourth side of the shutter is connected to the slide track.

14. The lens device according to claim 13, wherein the shutter comprises:
 at least one guide portion, disposed at the third side or the fourth side, the guide portion being movably disposed in the slide track.

15. The lens device according to claim 13, further comprising:
 a body cover, disposed at the opening of the main body and located on an upper surface of the connector.

16. The lens device according to claim 1, further comprising:
 a shutter cover, disposed on a surface of the shutter opposite to the main body.

17. The lens device according to claim 1, further comprising:
 a lens module, disposed on the main body and close to the second end.

18. A lens device, comprising:
 a main body, comprising a long axis direction, a first end, a second end, and a first side and a second side opposite to each other, wherein the first end and the second end are respectively located at two opposite ends in the long axis direction, and the first side and the second side are parallel to the long axis direction;
 a positioning magnet group, disposed on the main body, the positioning magnet group comprising:
  a first positioning magnet, close to the first end and the first side;
  a second positioning magnet, close to the second end and the second side; and
  a fourth positioning magnet, located between the first positioning magnet and the second positioning magnet, and close to the second side;
 a shutter, movably disposed on the main body, the shutter comprising a third side and a fourth side opposite to each other, wherein the third side corresponds to the first side and the fourth side corresponds to the second side; and
 a fixed magnet group, disposed on the shutter, the fixed magnet group comprising:
  a first fixed magnet, close to the third side, the first fixed magnet attracting with the first positioning magnet; and
  a second fixed magnet, close to the fourth side, the second fixed magnet attracting with the second positioning magnet and repelling with the fourth positioning magnet.

* * * * *